UNITED STATES PATENT OFFICE.

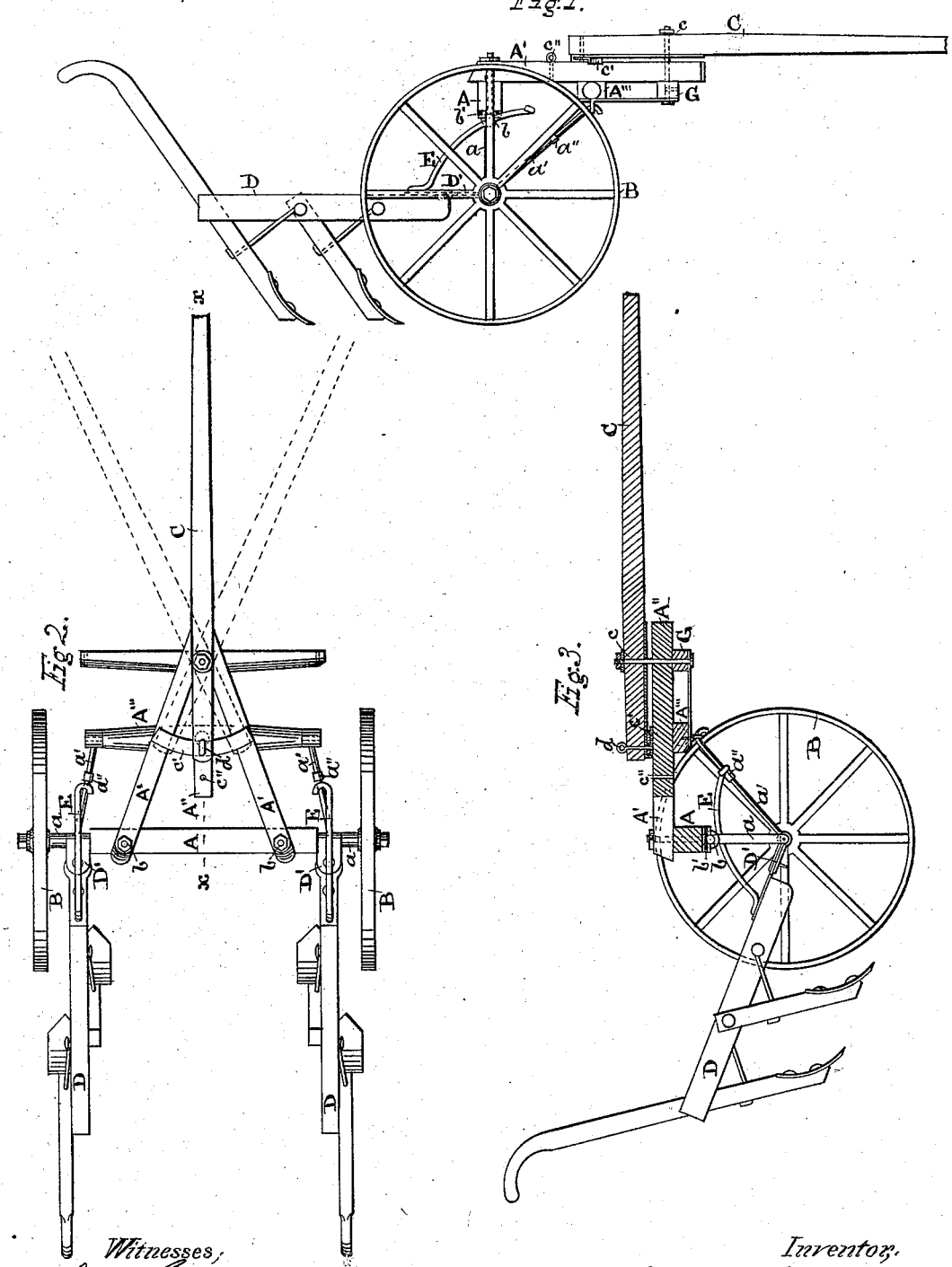

JOSEPH STAFFORD, OF GALESBURG, ILLINOIS.

IMPROVEMENT IN WHEEL-CULTIVATORS.

Specification forming part of Letters Patent No. 158,752, dated January 12, 1875; application filed August 21, 1874.

*To all whom it may concern:*

Be it known that I, JOSEPH STAFFORD, of Galesburg, in the county of Knox and State of Illinois, have invented certain Improvements in Straddle-Row Cultivators, of which the following is a specification:

The first part of my invention relates to the combination, in a walking straddle-row cultivator, of the wheels, frame, and plows, with a pivoted tongue, so as to enable the driver to control the direction of the machine by means of the plow-handles, and to save the horses from the whipping motion and unequal bearing of the rigid tongue, and also to facilitate the turning the machine in a smaller space at the end of the row. The second part of my invention relates to the suspension of the plows out of ground when not needed in plowing, by means of suspending-rods attached to the plow-beams, and hooking upon the axle or upon the braces or frame-work in front of the axle.

In the accompanying drawings, Figure 1 is a side view of my improved cultivator; Fig. 2, a plan view of the same; and Fig. 3 is a vertical sectional view through the line $x\ x$, Fig. 2.

Referring to the parts by letters, A represents the axle or truck frame, supported on wheels B B. The central portion of the axle is elevated and secured to bent metal bars or brackets $a\ a$, the lower horizontal ends of which form spindles for the wheels and journals for the coupling-joints of the beams. The upper ends of the bars $a\ a$ are secured to the elevated portion of the axle by eyebolts $b$, and kept in position by grooved plates $b'$. By this method of attaching the bars $a\ a$ to the elevated portion of the axle, the wheels and plow-beams may be readily adjusted nearer together or farther apart, as circumstances may require, by simply loosening the nuts on the eyebolts, moving the bars $a\ a$ in or out, and again tightening up the nuts. $A^1\ A^1$ are two converging bars, the rear ends of which are secured to the elevated portion of the axle A by the eyebolts $b$, and their forward ends united to each other and to a central longitudinal bar, $A^2$. $A^3$ is a transverse bar secured to the bars $A^1\ A^2$, and connected with the lower horizontal portions of the bars $a\ a$ by means of brace-rods $a^1\ a^1$. These bars $A^1\ A^1$, $A^2$ and $A^3$, and $a\ a\ a^1\ a^1$ constitute the frame of the machine, the form of which may be varied at pleasure, so long as it serves the purpose of a truck-frame to which the plow-beams may be conveniently attached, and by which they are dragged forward, and so long as it forms convenient support for the pivoted tongue, which I will now proceed to describe. C represents the tongue, pivoted by a vertical bolt, $c$, to the forward end of the bars $A^1\ A^2$; its rear end attached to and sliding on an arc-shaped plate, $c^1$, so as to have a free lateral motion to the right or left, as clearly shown by dotted lines in Fig. 2 of the drawings. A bolt-hole is formed in the rear end of the tongue, and a similar hole is formed in the center of the arc-shaped plate $c^1$, and, when desired, it may be converted into a rigid tongue, or rigidly secured to the frame by passing a bolt, $d$, down through these holes, and the bolt itself may be conveniently carried when not so in use by inserting it in a hole formed in the bar $A^2$ in rear of the tongue, as shown at $c^2$ in the drawings. D D are plow-beams, of the usual construction of this class of implement, their forward ends being hinged or pivoted to the lateral portion or lower ends of the bars $a$, by means of joint-pieces D', which permit of the beams being moved by the handles freely and independently in a vertical and lateral direction. E E are rods or bars, the rear ends of which are secured to the forward end of the plow-beams. They project forward of the axle, and are provided with hooks on their forward ends, which catch on either of vertical portions of the bars $a$ or to the braces $a^1$, and thereby support the beams and plows in an elevated position clear above the ground when not in use; and, for the purpose of retaining the hook in position, a stud or enlargement, $a^2$, may be formed on the brace-rod $a^1$. G is the double-tree, pivoted to the frame by the pivot-bolt of the tongue.

The advantages of my improved pivoted tongue are as follows: The rigid or stiff tongue heretofore in common use in this class of implements is found to operate to great disadvantage, especially in fields when the ground is from any cause uneven either to the wheels or plows, because of the whipping motion thereby produced, the end of the tongue striking against the horses' shoulders, causing abrasion of the skin, and making them fretful while at work. The stiff tongue is also objectionable in use in this class of cultivator when horses of unequal strength or speed are hitched together, because the stiff tongue in such case always bears against and becomes oppressive to the slower horse. It is also well known to those skilled in the art that the use of the rigid tongue of this class of machines is accompanied with much labor to the plowman or operative, because, when the corn is irregular in its growth, he must, by manual strength, move the plow-beams to the right or left to avoid plowing out such irregular plants. All these objections to and difficulties in the operation of this class of machines are obviated by the use of the pivoted tongue, for, with the pivoted and free tongue, the driver is enabled to change the direction of the wheels and main body of the machine, and, consequently, the direction of the plows, by simply bearing heavier upon one handle or plow-beam than upon the other, and thereby accommodate the plows to crooked rows and irregular plants without lessening the depth of cultivation or interfering with the uniform direction of the team. The driver is also relieved, in great measure, from the difficulties of driving the team and attending to the movement of the beams at the same time, while the whipping motion of the tongue before referred to is entirely obviated. By means of the pivoted tongue, also, the operation of turning the machine at the end of the row can be accomplished in much less space and with much greater ease and facility than with the stiff tongue. The advantages resulting from the use of the suspending-rods secured to the forward end of the tongue, and projecting forward of the axle, will also be obvious to those skilled in the art, as it obviates the necessity for extending the tongue or hounds of the tongue in rear of the axle, and providing them with suspending-hooks on which to hook up the beams, the use of such device projected in rear of the axle being objectionable, as interfering with the vision of the operator, or presenting an obstacle between his eyes and the corn being cultivated.

What I claim as my invention, and for which Letters Patent are desired, is—

1. In a walking straddle-row cultivator, the combination of the pivoted pole C, rigid axle A, wheels B, and plow-beams D D, so that the operator may control the direction of the machine by the plow-handles, and permit of the tongue vibrating freely, substantially as and for the purpose specified.

2. The suspending-rods E E, secured to the forward ends of the plow-beams, and projecting forward of the axle, and operating in combination with the brace-rods $a^1$ $a^1$, substantially as and for the purpose specified.

JOSEPH STAFFORD.

Witnesses:
   A. KITCHELL,
   JNO. E. FROST.